United States Patent [19]

Bateman

[11] Patent Number: 4,977,579
[45] Date of Patent: Dec. 11, 1990

[54] TEST SET FOR A NAVIGATIONAL SATELLITE RECEIVER

[75] Inventor: Ray E. Bateman, Dayton, Md.

[73] Assignee: The United States of America as represented by the Secretary of the Navy, Washington, D.C.

[21] Appl. No.: 620,659

[22] Filed: Jun. 14, 1984

[51] Int. Cl.[5] .................... H04B 3/46; H04B 12/00
[52] U.S. Cl. .................... 375/10; 371/20.1; 455/226; 370/15
[58] Field of Search .................... 375/10; 371/22, 27; 370/15; 455/226; 324/118

[56] References Cited

U.S. PATENT DOCUMENTS

| | | | |
|---|---|---|---|
| 3,594,651 | 7/1971 | Wolejsza, Jr. | 375/9 |
| 3,622,877 | 11/1971 | McDavid et al. | 375/10 |
| 3,743,938 | 7/1973 | Davis | 375/10 |
| 3,824,548 | 7/1974 | Sullivan et al. | 371/22 |
| 3,845,484 | 10/1974 | Sawicki et al. | 340/825.36 |
| 3,875,500 | 4/1975 | Fletcher et al. | 375/10 |
| 3,977,001 | 8/1976 | Bishop | 343/17.7 |
| 4,314,234 | 2/1982 | Darrow et al. | 455/226 |
| 4,377,822 | 3/1983 | Noirel et al. | 375/10 |

OTHER PUBLICATIONS

"Radio Frequency", *Data Communications Dictionary*, Sippl, Van Nostrand Reinhold Company, 1976, p. 389.

*Primary Examiner*—Douglas W. Olms
*Assistant Examiner*—Tesfaldet Bocure
*Attorney, Agent, or Firm*—Kenneth E. Walden; John G. Wynn

[57] ABSTRACT

A test set including a digital card tester section and a satellite simulator section is used to detect the reduced capabilities of an associated navigational satellite receiver and to isolate malfunctions therein. The digital card tester section is configured to generate digital signals (signatures) which are used to test and isolate faults in four digital system boards (cards) of the associated navigational satellite receiver. The satellite simulator section is configured to generate a facsimile of a navigational reference signal which is normally transmitted by an associated satellite system and received by the aforementioned associated navigational satellite receiver. The facsimile signal is used to test the receiver-processor section of the associated navigational satellite receiver.

10 Claims, 4 Drawing Sheets

TEST SET FOR A NAVIGATIONAL SATELLITE RECEIVER

CROSS-REFERENCE TO RELATED APPLICATION

The present application contains subject matter which is related to the subject matter disclosed in U.S. patent application Ser. No. 620,658, to D. L. Mitchell, entitled, "A Test Set For A Navigational Satellite Receiver", filed June 14, 1984, and assigned to the same assignee as the present application.

BACKGROUND OF THE INVENTION

1. Field of the Invention

The present invention generally relates to a test set for determining the operational status of an associated navigational satellite receiver, but more specifically, the present invention relates to a test set having the dual capability of isolating faults in a digital section of the associated navigational satellite receiver and generating a facsimile of a navigational satellite reference signal for isolating faults in a receiver processor section of the aforementioned associated navigational satellite receiver.

2. Description of the prior art

The AN/SRN-19(V)2 is an automatic shipboard radio navigational set that provides a continuous display of the position of the ship upon which it is associated. The ship's position, which is normally obtained by dead reckoning on the ship's true speed and heading, is periodically updated by fixes on a plurality of satellites. These satellites are part of the Navy Navigational Satellite System (NNSS), which is a world wide, all weather navigational system consisting of, inter alia, five satellites in polar orbits. The AN/SRN-19(V)2 shipboard radio navigational set, aforementioned, operates on a dedicated navigational program or algorithm which enables navigators to obtain accurate fixes using the data received from one of the five orbiting satellites.

Each satellite orbits the earth in approximately 107 minutes and continually transmits the following phase modulated data every two minutes on two radio frequency (RF) carriers: (1) time synchronization signals, (2) a 400 MHz signal, and (3) fixed and variable parameters describing the satellite's orbit. It should be mentioned that the foregoing satellite system is also used by commercial concerns.

The AN/SRN-19(V)2 radio navigational set comprises, inter alia, an antenna, an RF amplifier and a receiver-processor including a receiver portion and a data processor portion. The receiver portion extracts, amplifies and formats message information from the RF signal transmitted by the satellite and measures the doppler shift of this same signal. The reconstructed doppler shift of the satellite signal results from a relative motion between the receiver and the satellite. The message data obtained by the phase modulation of the RF carrier describes the satellite's position at an even two minute universal time period. The data processor processes inputs from the receiver, the ship's electromagnetic log and gyrocompass through two synchro-to-digital (S/D) converters and a receiver-processor keyboard. The data processor then performs computations and provides the desired outputs to a front panel display, a readout indicator, a printer and a cassette recorder.

It has been determined over a period of years that users of the NNSS were having problems determining whether the receiving equipment, for example, the AN/SRN-19(V)2, for obtaining their position was operating correctly, whether the receiving equipment was within the calibration range required for certification thereof, and, indeed, at times at sea (where references as to the ship's position were not available), whether the receiving equipment was operational.

Consequently, there is a need in the prior art for the capability of certifying satellite navigational receivers for operational readiness, and to facilitate and enable the end users to determine if there is, in fact, a failure and what the failed part is. Thus, the logistics could then be set-up so that instead of returning the particular navigational satellite receiver to a base depot for repair, the cognizant operator would be able to determine, in the field, what are the failed parts and request the particular replacement therefor.

The test set, according to the present invention, is configured to operate with the AN/SRN-19(V)2 radio navigational set, which is fully disclosed in the publication entitled, "Shipboard Operations and Maintenance Manual" (NAVELEX 0967-LP-634-9010).

OBJECTS OF THE INVENTION

Accordingly, an important object of the present invention is to configure a test set for operation with a predetermined associated navigational satellite receiver so as to certify the readiness thereof.

Another object of the present invention is to configure the test set so as to not only test the pertinent sections of the associated navigational satellite receiver, but, also, to be able to localize a failed part therein.

Yet another object of the present invention is to configure the test set to be portable and easy to interface with the predetermined associated navigational satellite receiver.

A further object of the present invention is to configure the test set so that it maintains its calibration over a long period of time and is easy to operate under field conditions.

Still a further object of the present invention is to configure the test set so as to generate a facsimile of the actual satellite signals so as to activate the "normal functions" of the predetermined associated navigational satellite receiver, so that the test set can be used as a training device (simulator) aboard ship when the ship is out of "view" of the Navy Navigational Satellite System (NNSS).

SUMMARY OF THE INVENTION

The test set, according to the present invention, by which the foregoing and other objects, features and advantages are accomplished is characterized, inter alia, by configuring it to comprise two independent test sections, which are a digital card tester section and a satellite simulator section.

The digital card tester section is used to test and isolate faults in four digital boards (cards) of an associated navigational satellite receiver, for example, the AN/SRN-19(V)2. A microprocessor portion of the digital card tester section is configured to generate a fixed pattern of test signals (signatures) with a predetermined response pattern. A fail indicator illuminates when any response deviation occurs. A pass indicator illuminates when a particular circuit board has successfully completed the test.

The satellite simulator section generates a satellite type radio frequency (RF) signal at a predetermined frequency for testing the receiver section of the aforementioned associated navigational satellite receiver, by signal insertion or radiation, in the absence of a system satellite. Various signal levels, degrees of phase modulation and signal frequencies are selectable by controls and switches associated with the satellite simulator section.

The aforementioned lights, controls and switches, inter alia, are disposed on and affixed to an escutcheon panel and a chassis combination, along with a common power supply. This configuration unifies the digital card test section and the satellite simulator section into a complete and portable test set.

BRIEF DESCRIPTION OF THE DRAWINGS

The foregoing and other objects and novel features and advantages of the present invention will be more apparent from the following more particular description of the preferred embodiments as illustrated in the accompaning drawings, in which.

DESCRIPTION OF THE PREFERRED EMBODIMENTS

The following is a description of the digital card tester section of a test set for a navigational satellite receiver, according to the present invention. A description of the satellite simulator section follows hereinafter.

Figure 1:
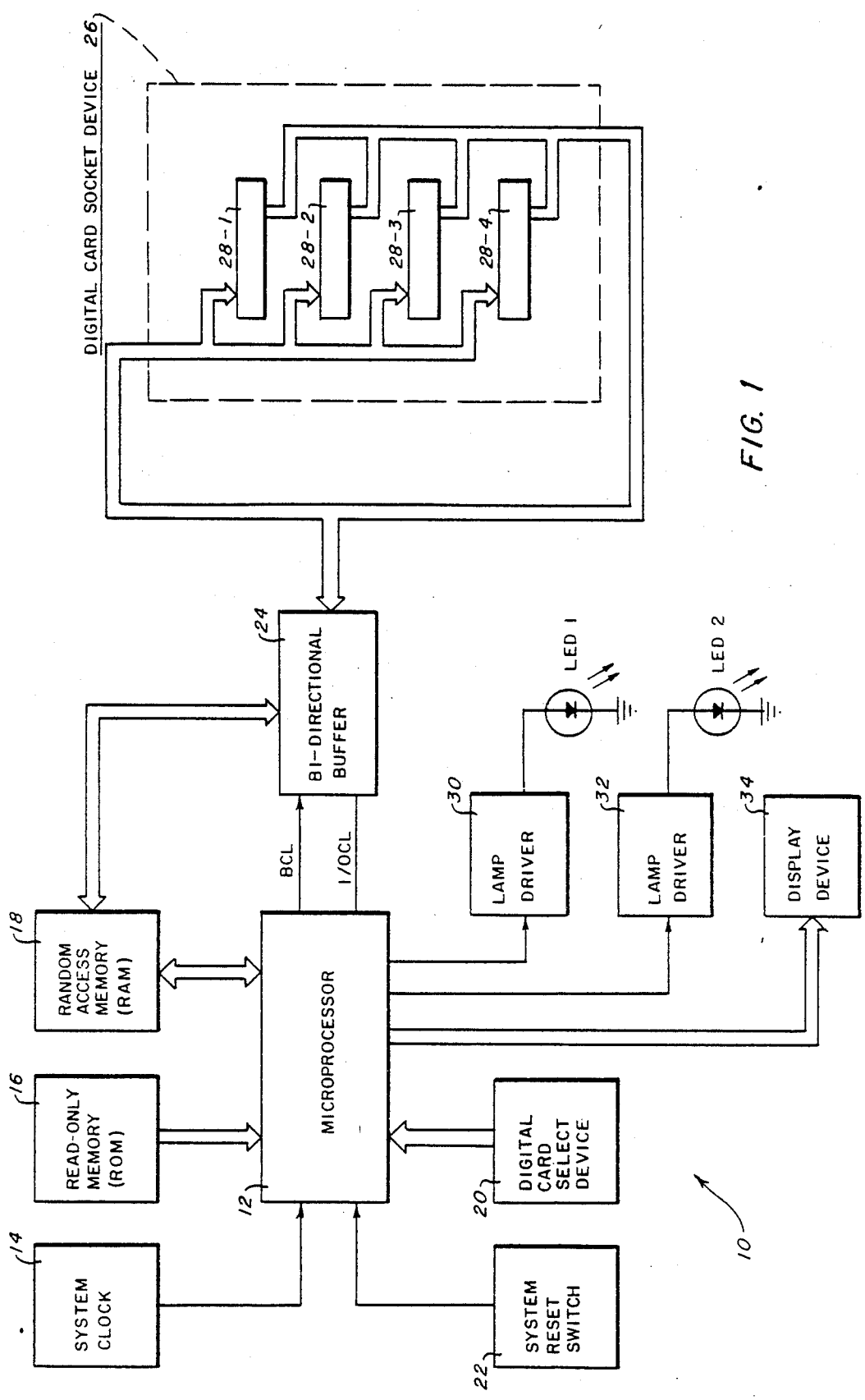
FIG. 1 is a block diagram representation of the digital card tester section of a test set for a navigational satellite receiver including, inter alia, a microprocessor portion and a read-only memory (ROM) portion, according to the present invention.

Referring then to FIG. 1, the digital card tester (DCT) section 10 comprises a microprocessor 12, a system clock 14, a read-only memory (ROM) 16 and a random access memory (RAM) 18. The DCT section 10 further comprises a digital card select device 20, a system reset switch 22, a bi-directional buffer 24, a digital card socket device 26 including a plurality of digital sockets 28-1, 28-2, 28-3 and 28-4, a lamp driver 30 having a corresponding pass indicator LED 1, a lamp driver 32 having a corresponding fail indicator LED 2 and a display device 34. For purposes of the present invention LED 1 and 2 are green and red light-emitting diodes, respectively.

Still referring to FIG. 1, the system clock 14 generates periodic signals used for synchronization and is operatively connected to the microprocessor 12. The ROM 16 and the RAM 18 are also operatively connected to the microprocessor 12. The microprocessor 12 is configured to execute the program stored in the ROM 16 and execute and interpret other instructions from the system reset switch 22 and the digital card select device 20. The microprocessor 12, via its bus control line (BCL) and its input/output control line (I/OCL), in cooperation with the bi-directional buffer 24, controls the flow of information to/from the RAM 18. The lamp driver 30 drives the pass indicator LED 1, and the lamp driver 32 drives the fail indicator LED 2, both being under the control of the microprocessor 12. In addition, the microprocessor 12 is operatively connected to the display device 34 for displaying the results of the test of a particular digital circuit board connected to a particular one of the digital sockets 28-1, 28-2, 28-3 or 28-4 of the digital card socket device 26. The operation of the DCT section 10 of FIG. 1 will be further described and explained hereinafter under the heading "Statement of the Operation."

Figure 2:
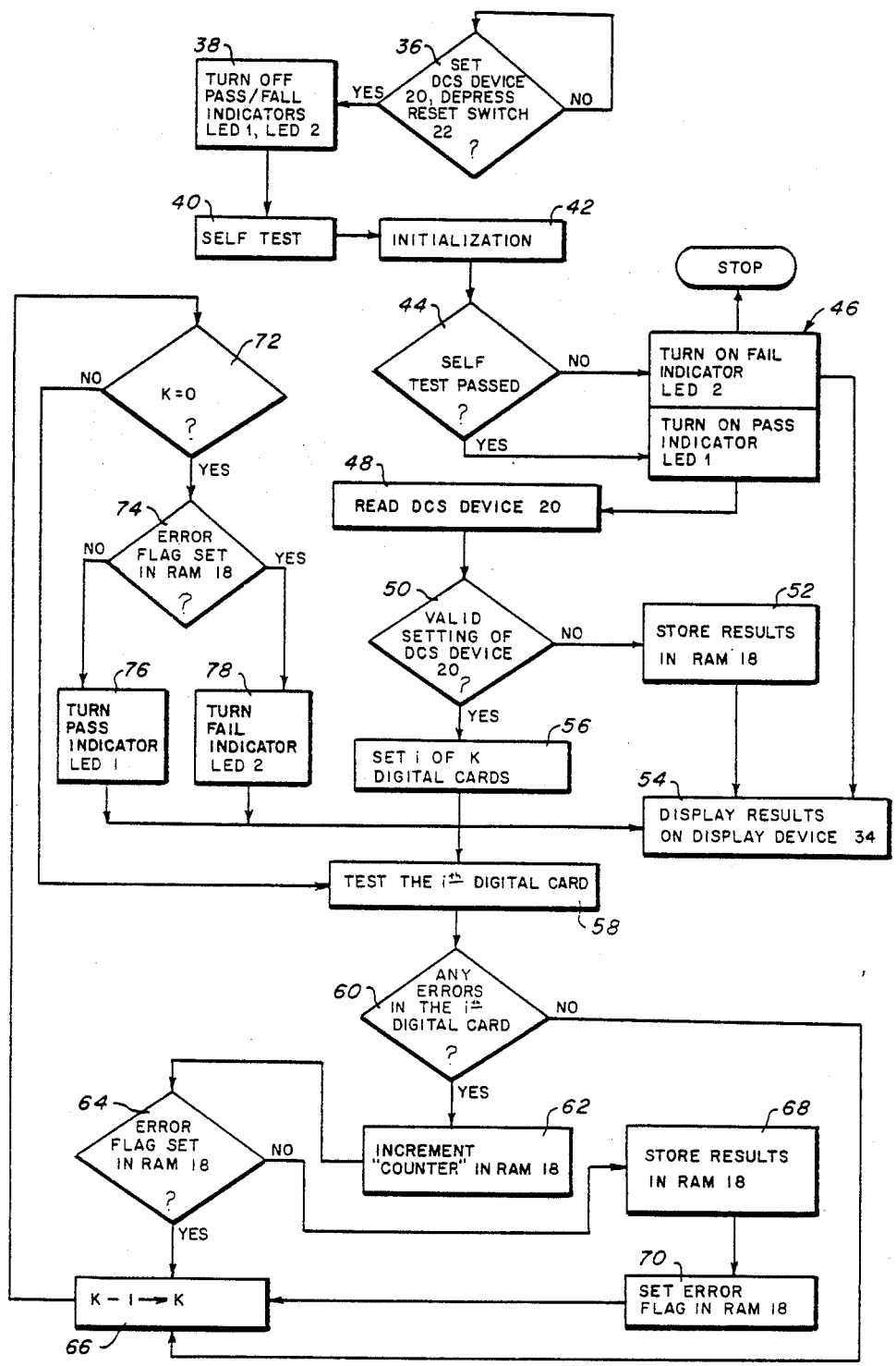
FIG. 2 is a specific pictorial flowchart illustrating the program stored in the ROM portion of FIG.1 and the steps necessary for the proper operation of the microprocessor portion of FIG. 1 during the testing of one of the four digital system boards (cards) of the associated navigational satellite receiver.

FIG. 2, is a specific pictorial flowchart illustrating the program and steps necessary for the proper operation of the digital card tester section of FIG. 1 and will be used in the discussion of the operation thereof The process blocks and the decision blocks in the aforementioned flowchart are designated with the numerals 36 through 78.

Following now is a brief description of the satellite simulator section of the test set for a navigational satellite receiver, according to the present invention.

Figure 3:
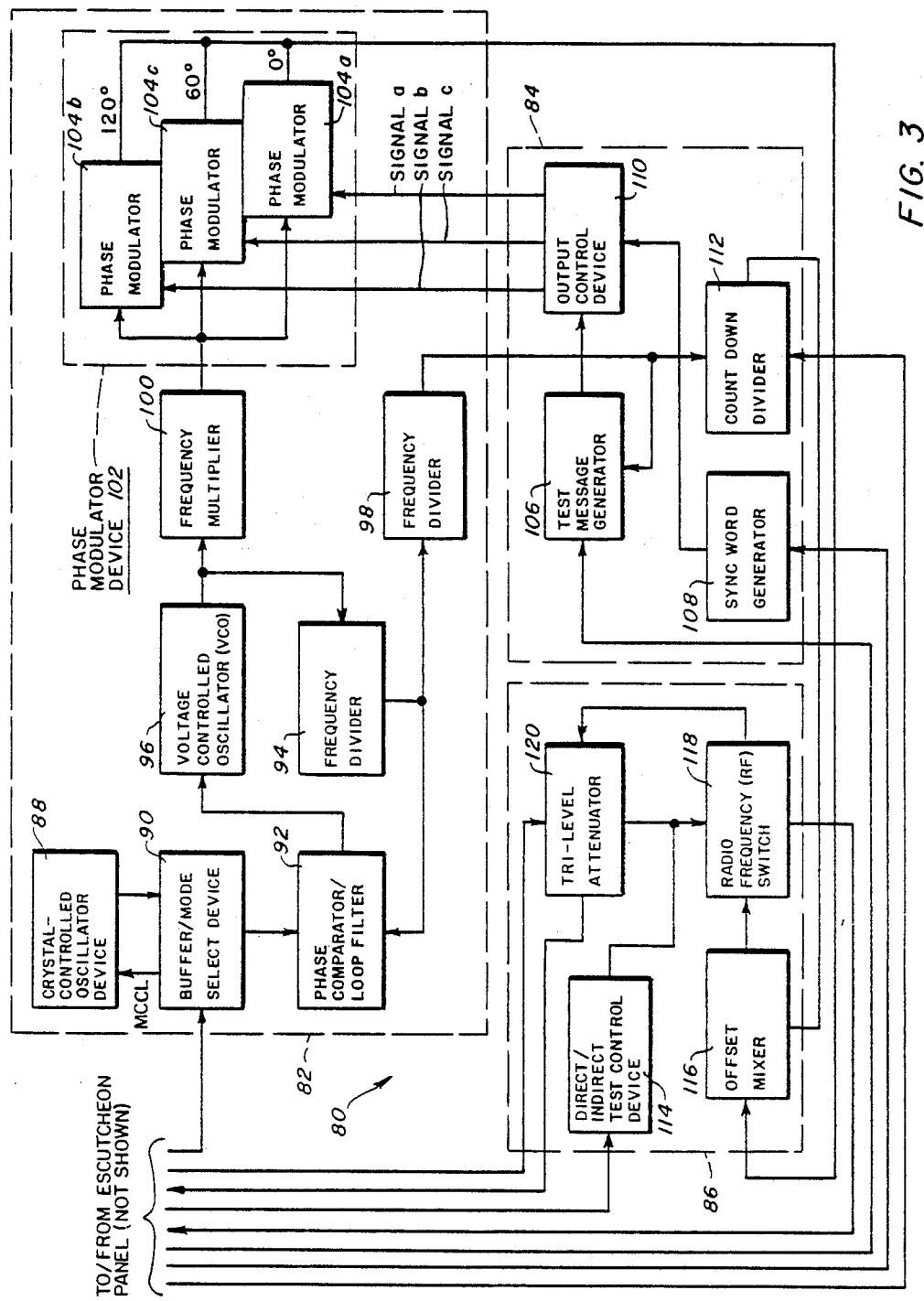
FIG. 3 is a block diagram representation of the satellite simulator section of the test set for a navigational satellite receiver, according to the present invention depicting, inter alia, a radio frequency portion and a digital portion thereof.

Referring then now to FIG. 3, the satellite simulator section 80 comprises a radio frequency portion 82, a digital portion 84 and an interface portion 86. The radio frequency portion 82 is configured to generate a crystal referenced approximately 400 MHz signal, which is ± 60 degrees phase modulated. The digital portion 84 is configured to generate a sequence of digital data for driving the radio frequency portion 82. The interface portion 86 is configured to interface between the aforementioned radio frequency portion 82 and the associated navigational satellite receiver under test.

To continue, the radio frequency portion 82 comprises a crystal-controlled oscillator device 88 operatively connected to a buffer/mode select device 90 which is configured to automatically switch between the output of the aforementioned crystal-controlled oscillator device 88 and an external input signal from the associated navigational satellite receiver under test via an escutcheon panel (not shown). A phase comparator/loop filter 92 is part of a phase-locked-loop (PLL) comprising a frequency divider 94 and a voltage controlled oscillator (VCO) 96. The output of the buffer/mode select device 90 drives the phase comparator/loop filter 92, which, in turn, drives the aforementioned VCO 96 whose output feeds the frequency divider 94. In turn, the frequency divider 94 feeds the aforementioned phase comparator/loop filter 92 thereby completing the phase-locked-loop feedback path. The frequency divider 94 also drives a frequency divider 98 whose output is operatively connected to the digital portion 84 of the satellite simulator section 80.

Still referring to FIG. 3, the radio frequency portion 82 further comprises a frequency multiplier 100 whose input is connected to the output of the VCO 96. The output of the frequency multiplier 100 is operatively connected to the input of a phase modulator device 102, which includes a phase modulator 104a, a phase modulator 104b and a phase modulator 104c each having phase delays of 0, 120 and 60 degrees, respectively. The phase modulator device 102 is also operatively connected to the digital portion 84. The output of the phase modulator device 102 is operatively connected to the interface portion 86 of the satellite simulator section 80.

The digital portion 84 of the satellite simulator section 80 comprises a test message generator 106, a sync word generator 108, an output control device 110 and a count down divider 112. The test message generator 106 and the sync word generator 108 are, both, operatively connected to the output control device 110 whose output signals a, b, and c drive the corresponding phase modulators 104a, 104b and 104c of the phase modulator 102. The input of the test message generator 106 and the input of the count down divider 112 are, both, driven by the frequency divider 98 of the radio frequency portion 82. The test message generator 106 and the sync word generator 108 are activated by switches (not shown) on the aforementioned escutcheon panel. Along with a common chassis and power supply (not shown), the aforementioned digital card tester section 10 of FIG. 1 and the satellite simulator section 80 of FIG. 2 are unified into a complete and portable test set.

To continue, the interface portion 86 comprises a direct/indirect test control device 114, an offset mixer 116, a radio frequency (RF) switch 118 and a tri-level attenuator 120. The input of the offset mixer 112 is driven by the output of the aforementioned phase modulator device 102. The output of the count down divider 112 of the digital portion 84 also is operatively connected to the offset mixer 116. The output of the mixer drives the RF switch 118 which directs the signal at its input either to the tri-level attenuator 120 or to the aforementioned escutcheon panel as directed by the direct/indirect test control device 114. The direct/indirect test control device 114 also is operatively connected to the tri-level attenuator 120. In addition, switches (not shown) on the aforementioned escutcheon panel operate to control the power level output of the tri-level attenuator 120.

More about the coaction and operation of the foregoing elements of the radio frequency portion 82, the digital portion 84 and the interface portion 86 of the satellite simulator section 80 will be explained hereinafter under the heading "Statement of the Operation."

STATEMENT OF THE OPERATION

Details of the operation, according to the digital card tester section of the present invention, are explained in conjunction with FIGS. 1 and 2. Details of the operation, according to the satellite simulator section of the present invention, are explained in conjunction with FIGS. 3 and 4.

Referring first to FIGS. 1 and 2 as viewed concurrently, the digital card select device 20 is set to a digital socket position corresponding to a digital card "i" of a plurality of digital cards "K" to be tested, and generates a predetermined digital word in response to the selection. The digital card "i" is inserted in the proper one of the digital sockets 28-1 through 28-4 of the digital card socket device 26, each digital socket being configured one-to-one for each digital system board. Then, the system reset switch 22 is depressed, as indicated by the decision block 36, thereby causing an interrupt to the microprocessor 12. The microprocessor 12 is initialized (as indicated by process blocks 38, 40 and 42, decision block 44 and process block 46) by scanning the digital card select device 20, as depicted by process block 48, to direct it to the proper memory location in the ROM 16. This memory location is read into the microprocessor 12 and then stored in the RAM 18, as indicated by the process block 52. The foregoing data consist of a self-test and the program in the ROM 16 used to test the plurality of digital cards "K" from the associated navigational satellite receiver, which for purposes of the present invention is the AN/SRN-19(V)2. This data contain a test program having a test pattern and a signature response designed for the plurality of digital cards "K" under test.

To continue, simultaneously with reading the digital card select device 20, the microprocessor 12 turns off the pass indicator LED 1 via the lamp driver 30, and the fail indicator LED 2 via the lamp driver 32. Concurrently, the microprocessor 12 performs the self-test, as indicated by the process blocks 38, 40 and 42, and the decision block 44 and the process block 46. At the completion of the self-test, both the pass indicator LED 1 and the fail indicator LED 2 are turned on and off to verify proper operation. This aspect of the program is illustrated by the process block 46, aforementioned.

Still referring to FIGS. 1 and 2 as viewed concurrently, the microprocessor 12 now directs the bi-directional buffer 24 into an output mode of operation, which causes the RAM 18 to transmit the test pattern data to the selected digital card "i" via the digital card socket device 26. The testing of the digital card "i" is then performed with the microprocessor 12 controlling the bi-directional buffer 22. If during a comparison of the signature response in the RAM 18 and the output from the digital card "i" a discrepancy occurs, then an error flag is set in the microprocessor 12 (RAM 18) causing the fail indicator LED 2 to illuminate. The foregoing operation is illustrated by the process block 56, the process block 58, the decision block 60, the process block 62, the decision block 64, the process block 66, the process block 68, the process block 70, the decision block 72, the decision block 74 and the process block 78. On the other hand, if an error flag is not set during the test, then the pass indicator LED 1 is illuminated, as indicated by the process block 76. In addition, the stored information in ROM 18, as indicated by the process block 52, is displayed on the display device 34, as indicated by the process block 54. Also, displayed information as to the turning on of the pass indicator LED 1, or the fail indicator LED 2 is also displayed on the display device 34, as indicated by the process block 54. The displayed information is a digital word which gives information as to what part of the particular digital card "i" under test failed. In this way, an operator, if desired, can cross-reference to a print out and determine the actual failed component.

The test pattern and signature response are temporarily stored in the RAM 18 during the testing of the digital card "i". This information is replaced every time the digital card select device 20 and the system reset switch 22 are depressed. The signature response comparison is performed in the RAM 18 under the control of the microprocessor 12. It should be mentioned, that each of the plurality of digital cards "K" has a unique signature response which is permanently stored in the ROM 16. Accordingly, when the test for a particular digital card "i" is selected by the digital card select device 20, this information is transferred to the ROM 18 for comparison and detection of errors during the test. The system clock 14, as aforementioned, is a frequency control for the microprocessor 12, the ROM 16 and the RAM 18, and, thus, determines the test time for the testing of the plurality of digital boards "K".

The digital card tester section 10 is configured to test the four digital boards (cards) of the AN/SRN-19(V)2 radio navigational set. However, the techniques disclosed herein could be applied to the testing of any digital board having a known signature response that adequately specifies the proper operation thereof. For the foregoing purpose, the ROM 16 can be a programmable read-only memory (PROM).

Figure 4:
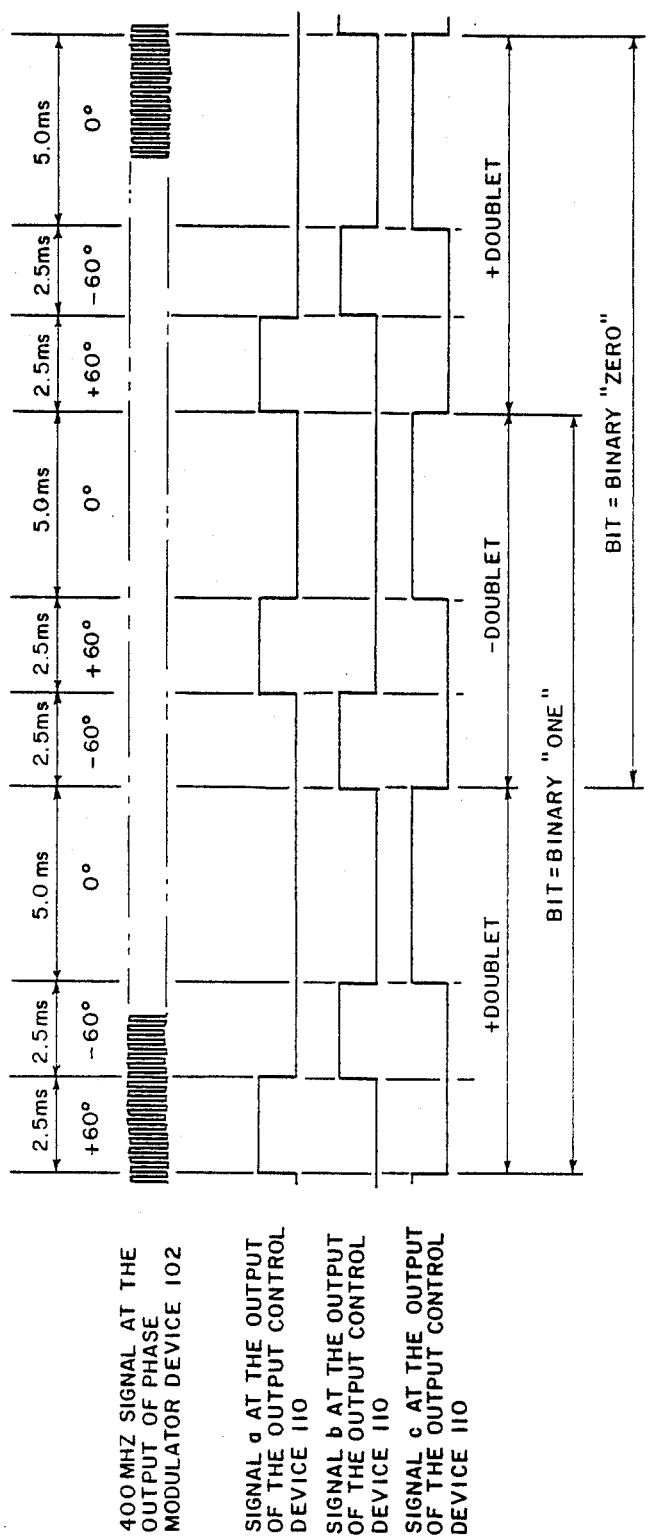
FIG. 4 is a waveform diagram illustrating the interrelationship of the radio frequency portion and the digital portion of the satellite simulator section of FIG. 3 during the operation thereof.

The operation of the satellite simulator section 80 of the test set for a navigational satellite receiver can best be understood by referring to FIGS. 3 and 4 as viewed concurrently. The satellite simulator section 80 has a mode A and a mode B operation The mode of operation is dependent on whether the signal driving the buffer/mode select device 90 is internally derived from the crystal-controlled oscillator 88 (mode A) or externally derived from the associated navigational satellite receiver under test (mode B).

Continuing, at power turn on, and when no external signal is present at the buffer/mode select device 90, the crystal controlled oscillator 88 generates a 5 MHz-325 Hz signal. This sine wave signal is amplified and squared to a transistor-transistor logic (TTL) level in the buffer/mode select device 90. This squared signal, at the TTL level, acts as a reference input to the phase comparator/loop filter 92 whose other input is a 5 MHz signal derived from the coaction of the frequency divider 94 (divide by 20) and the voltage controlled oscillator (VCO) 96 (operating at near 100 MHz). The phase comparator/loop filter 92 is configured to phase compare the signal from the frequency divider 94 to the conditioned signal from the buffer/mode select device 90 and filter and amplify the resulting signal. This resulting or error signal is then applied to the input of the VCO 96. The foregoing elements of the radio frequency portion 82 comprise a phase-locked-loop (PLL) which operates to maintain the frequency of the VCO 96 phase coherent to the output signal of the crystal-controlled oscillator 88.

Still referring to FIGS. 3 and 4 as viewed concurrently, the output frequency of the VCO 96 is 20 times that of the crystal-controlled oscillator device 88, i.e, 100 MHz-6.5 KHz. This signal is multiplied in the frequency multiplier 100 (multiplied by 4) to a frequency of 400 MHz-26 KHz. The output of the frequency multiplier 100 drives the phase modulators 104a, 104b and 104c of the phase modulator device 102. Thus, the phase modulator device 102 has three signal paths between its input and output. These signal paths are all identical except for their electrical lengths, i.e, phase delays. The approximately 400 MHz input signal to the phase modulator device 102 is directed through one or the other of the phase modulators 104a, 104b or 104c, as controlled by the corresponding signals a, b or c on the respective modulator drive signal lines from the output control device 110 of the digital portion 84. The three modulator drive signals a, b and c are TTL level switching signals which, when at an up level, turn on their respective phase modulators 104a, 104b or 104c. The delays of the three signal paths of the phase modulators 104a, 104b and 104c are 0, 120 and 60 degrees, respectively. The 60 degree or phase modulator 104c path is, for purposes of the present invention, the reference phase of the composite signal at the output of the phase modulator device 102. The other two paths, 0° and 120 degrees, would then be ± 60°, respectively, relative to the reference phase.

Referring now primarily to FIG. 4, the sequence of switching between the phase modulators 104a, 104b and 104c is such that only one of them is on at a time. The phase modulator 104a, corresponding to the 0 degree path, is on for 2.5 milliseconds (ms). Then, the phase modulator 104b, corresponding to the 120 degree path, is on for 2.5 ms, followed by the phase modulator 104c, corresponding to the 60 degree path, being on for 5.0 ms. In the satellite modulation format, this sequence of 0, 120 and 60 degrees of phase modulation upon the 400 MHz-26 kHz signal corresponds to phase modulation changes of +60, −60 and 0 degrees, respectively, which is termed a "+ doublet". As shown, a "− doublet" corresponds to phase modulation changes of −60 degrees for 2.5 ms, +60 degrees for 2.5 ms, followed by 0 degrees for 5.0 ms. Thus, a bit equivalent to a binary "one" corresponds to a " + doublet" followed by a " − doublet". A bit equivalent to a binary "zero" corresponds to a " −doublet" followed by a " + doublet", as shown in FIG. 4.

Referring again to FIG. 3, the sequencing of phase modulator drive signals a, b, and c, is established by the test generator 106 in cooperation with the output control device 110.

Mode B operation is the same as mode A except that an external 5 MHz signal is brought into the satellite simulator section 80 from the escutcheon panel (not shown) via the buffer/mode select device 90. When this signal is applied, three events take place. First, the buffer/mode select device 90 operates to generate a mode change command signal on the mode change command line (MCCL) to the crystal-controlled oscillator device 88 thereby cutting it off. Second, the buffer/mode select device 90 selects the input 5 MHz signal and then amplifies and squares it to the TTL level. This signal now becomes the reference signal to the input of the phase comparator/loop filter 92. Third, the count down divider 112, under control of, for example, the aforementioned mode change command line signal, an offset select switch on the escutcheon panel (not shown), generates a 26 KHz or 39 KHz signal for feeding the offset mixer 116 of the interface portion 86. This operation is necessary because the output frequency of the radio frequency portion 82 in mode B operation is eighty times the frequency of the 5 MHz reference signal. Consequently, the output of the radio frequency portion 82 will be near, or exactly at 400 MHz. However, the receiver under test, which for purposes of the present invention is the AN/SRN-19(V)2, will not respond to an exact 400 MHz test signal. Thus, by passing the signal through the offset mixer 116, in cooperation with the output from the count down divider 112, a usable signal is generated either at 400 MHz-26 KHz or 400 MHz-39 KHz, depending on the position of the offset select switch, aforementioned. In mode B operation, the mixing signal (26 KHz or 39 KHz) is derived from a count down of the 100 MHz output of the VCO 96. This count down is partially accomplished by the frequency divider 94 (divide by 20) in cooperation with the frequency divider 98 (divide by 2). In mode B operation, the phase modulation of the approximately 400 MHz signal is the same as in mode A. However, in mode B operation the frequency stability is better than in mode A, and, accordingly, suitable for measuring the doppler reconstruction circuitry (not shown) and the frequency stability of the 5 MHz reference oscillator (not shown) of the associated AN/SRN-19(V)2.

The primary purpose of the digital portion 84 of the satellite simulator 80 of FIG. 3 is to generate the sequence of digital data (signals a, b and c) for driving the phase modulator device 102. The digital data are similar to that from a system satellite in terms of having a repeating message data pattern, as generated by the test message generator 106, and a two minute synchronization data pattern, as generated by the sync word generator 108. The test message generator 106 is configured to generate a signal (message data) corresponding to a repeating sequence of two binary "ones" followed by two binary "zeros". The test message generator 106 continually outputs this repeating pattern via the output control device 110 as the drive signals a, b and c. The drive signal for the test message generator 106 and the count down divider 112 is a 2.5 MHz signal from the output of the frequency divider 98 of the RF portion 82. As also controlled from the escutcheon panel (not shown), the sync word generator 108 is configured to generate a sync word consisting of 25 binary bits, i.e, a "zero", 23 "ones" and another "zero" in that order. Since each binary bit, "one" or "zero" requires 20.0 ms as, shown in FIG. 4, a sync word requires 0.5 seconds. After a sync word is completed, the output control device 110 in cooperation with the test message generator 106 automatically recommences the repeating message data sequence from the test message generator 106, as previously described.

The interface portion 82 serves to interface the test signal, at three different predetermined power levels, to the associated navigational satellite receiver under test via the output of the tri-level attenuator 120 (direct connection), or via the other output of the RF switch 188 (indirect connection) to a radiating antenna (not shown). The aforementioned two units are controlled by the direct/indirect test control device 114, which acts to switch between direct testing or indirect testing, of the associated navigational satellite receiver.

To those skilled in the art, many modifications and variations of the present invention are possible in light of the above teachings It is therefore to be understood that the present invention can be practiced otherwise than as specifically described herein and still be within the spirit and scope of the appended claims.

What is claimed is:

1. A satellite simulator section of a test set for detecting the reduced capabilities of an associated navigational satellite receiver, said satellite simulator section being configured to generate a facsimile of a predetermined navigational reference signal for testing and isolating faults in a receiver-processor section of the associated navigational satellite receiver, said satellite simulator section comprising:
    a radio frequency (RF) portion for generating a predetermined reference signal, said RF portion being configured to phase delay the reference signal predetermined amounts;
    a digital portion operatively connected to said RF portion, said digital portion being configured to generate a sequence of digital data for driving said RF protion so as, in coaction therewith, to cause the phase delay of the reference signal the predetermined amounts; and
    an interface portion operatively connected to said RF portion, said interface portion being configured to interface between said RF portion and the associated navigational satellite receiver under test,
wherein said RF portion comprises:
    a crystal-controlled oscillator device for generating a predetermined sine wave signal at its output;
    a buffer/mode select device operatively connected to said crystal-controlled oscillator device for switching between the predetermined sine wave signal or an external sine wave signal from the associated navigational satellite receiver under test so as to furnish a conditioned signal at its output;
    a phase-locked-loop (PLL) operatively connected to said buffer/mode select device, said PLL including a voltage controlled oscillator (VCO) having a signal at its output of a predetermined frequency, and said PLL being configured to maintain the predetermined frequency of the signal at the output of said VCO phase coherent with the conditioned signal at the output of said buffer/mode select device;
    a frequency divider operatively connected at its input to said PLL and at its output to said digital portion for dividing down the signal at its input a predetermined amount;
    a frequency multiplier operatively connected at its input to said VCO for multiplying the output of said VCO at the predetermined frequency to another predetermined frequency at the output of said frequency multiplier; and
    a phase modulator device operatively having an input connected to the output of said frequency multiplier, at another input to said digital portion and at its output to said interface portion so as to cause the phase delay of the reference signal the predetermined amounts.

2. The satellite simulator section of claim 1 wherein said buffer/mode select device is configured to amplify and square the sine wave signal from said crystal-controlled oscillator or the external sine wave signal from the associated navigational satellite receiver under test to a predetermined level, and said buffer/mode select device is configured to furnish a mode change command signal on its mode change command line (MCCL) to said crystal-controlled oscillator device thereby cutting it off when the external sine wave signal from the associated mavigational satellite receiver under test is present at its input.

3. The satellite simulator section of claim 2 wherein said PLL further comprises:
    another frequency divider operatively connected at its input to the output of said VCO for dividing down the signal at its input a predetermined amount; and
    a phase comparator/loop filter operatively connected to the output of said buffer/mode select device to the input of said VCO and to the output of said another frequency divider for filtering the signal from said another frequency divider and comparing it, in phase, to the conditioned signal from said buffer/mode select device and furnishing a difference signal therefrom to the input of said VCO.

4. The satellite simulator section of claim 3 wherein said phase modulator device comprises first, second and third phase modulators operatively connected at their inputs to form the one input of the phase modulator device connected to the output of said frequency multiplier, and having corresponding first, second and third another inputs operatively connected to said digital portion thereby forming the another input thereto, and having their outputs connected together so as to form the output to said interface portion, said first, second and third phase modulators being configured to cause corresponding first, second and third amounts of phase delay to the reference signal at its input(s) as it is directed therethrough as controlled by first, second and third signals on the first, second and third another inputs, respectively.

5. The satellite simulator section of claim 4 wherein said digital portion comprises:

a test message generator operatively connected to the output of said frequency divider for generating a signal (message data) corresponding to a repeating sequence of two binary "ones" followed by two binary "zeros";

a sync word generator for generating at its output a sync word consisting of a binary "zero", 23 binary "ones" and another binary "zero" in that order;

an output control device having first, second and third outputs corresponding to the first, second and third another inputs of said first, second and third phase modulators, said output control device having another input operatively connected to the output of said test message generator and yet another input operatively connected to the output of said sync word generator, said output control device furnishing the first, second and third signals at its corresponding outputs in response to the message data and the sync word at its inputs; and a count down divider operatively connected at its input to the output of said frequency divider and at its output to said interface portion for generating selectable predetermined first and second signals at its output.

6. The satellite simulator section of claim 5 wherein said interface portion comprises:

an offset mixer operatively connected at one input to the output of said phase modulator device and at its other input to the output of said count down divider for furnishing an output signal either at the frequency of the output signal less the frequency of the first signal at the output of said count down divider, or at the frequency of the output signal less the frequency of the second signal at the output of said count down divider, which ever is selected;

a radio frequency (RF) switch operatively connected at one input to the output of said offset mixer, said RF switch being configured to have a direct output and an indirect output;

a tri-level attenuator operatively connected at one input to the direct output of said RF switch for attenuating the signal at the one input to selectable first, second or third level signals at its output; and a direct/indirect test control device operatively connected to other inputs of said RF switch and said tri-level attenuator such that when activated for direct testing, the selectable first, second or third level signals are furnished at the output of said tri-level attenuator via the direct output of said RF switch for direct testing of the associated navigational satellite receiver, and such that when activated for indirect testing, the signal from said offset mixer is furnished at the indirect output thereof.

7. The satellite simulator section of claim 5 wherein the first, second and third amounts of phase delay correspond to 0 degree, 120 degrees and 60 degrees, respectively, which translate into +60 degrees, −60 degrees and 0 degree, respectively.

8. The satellite simulator section of claim 7 wherein a " + doublet " corresponds to a first switching sequence, and, accordingly, translated phase delays of +60, −60 and 0 degrees, in that order.

9. The satellite simulator section of claim 8 wherein a " − doublet " corresponds to a second switching sequence, and, accordingly, translated phase delays of −60, +60 and 0 degrees, in that order.

10. The satellite simulator section of claim 9 wherein a " + doublet " followed by a " − doublet " is equivalent to a binary "one", and a " − doublet " followed by a " + doublet " is equivalent to a binary "zero".

* * * * *